T. TRIPOLITIS.
BUTTER DISPENSING MACHINE.
APPLICATION FILED JUNE 13, 1918.
1,284,493.
Patented Nov. 12, 1918.
5 SHEETS—SHEET 1.
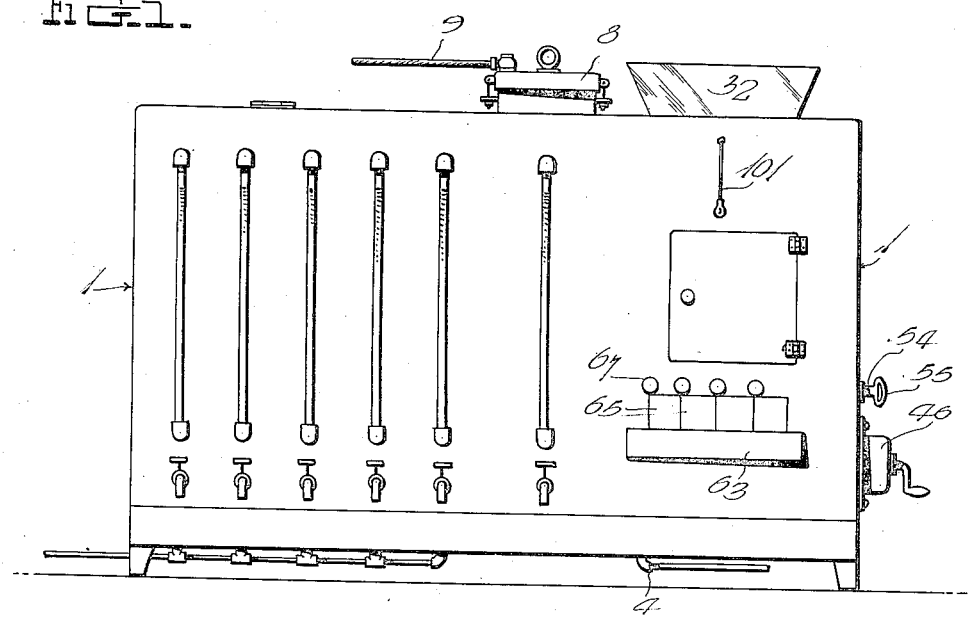
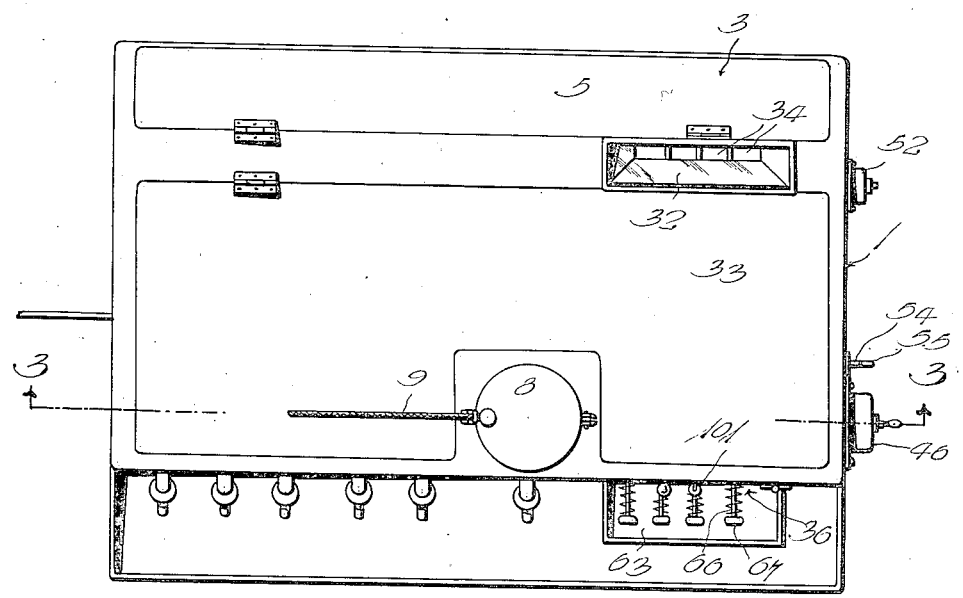
Witness
H. Woodard
Inventor
T. Tripolitis
By H. B. Willson & Co.
Attorneys T. TRIPOLITIS.
BUTTER DISPENSING MACHINE.
APPLICATION FILED JUNE 13, 1918.
1,284,493.
Patented Nov. 12, 1918.
5 SHEETS—SHEET 2.
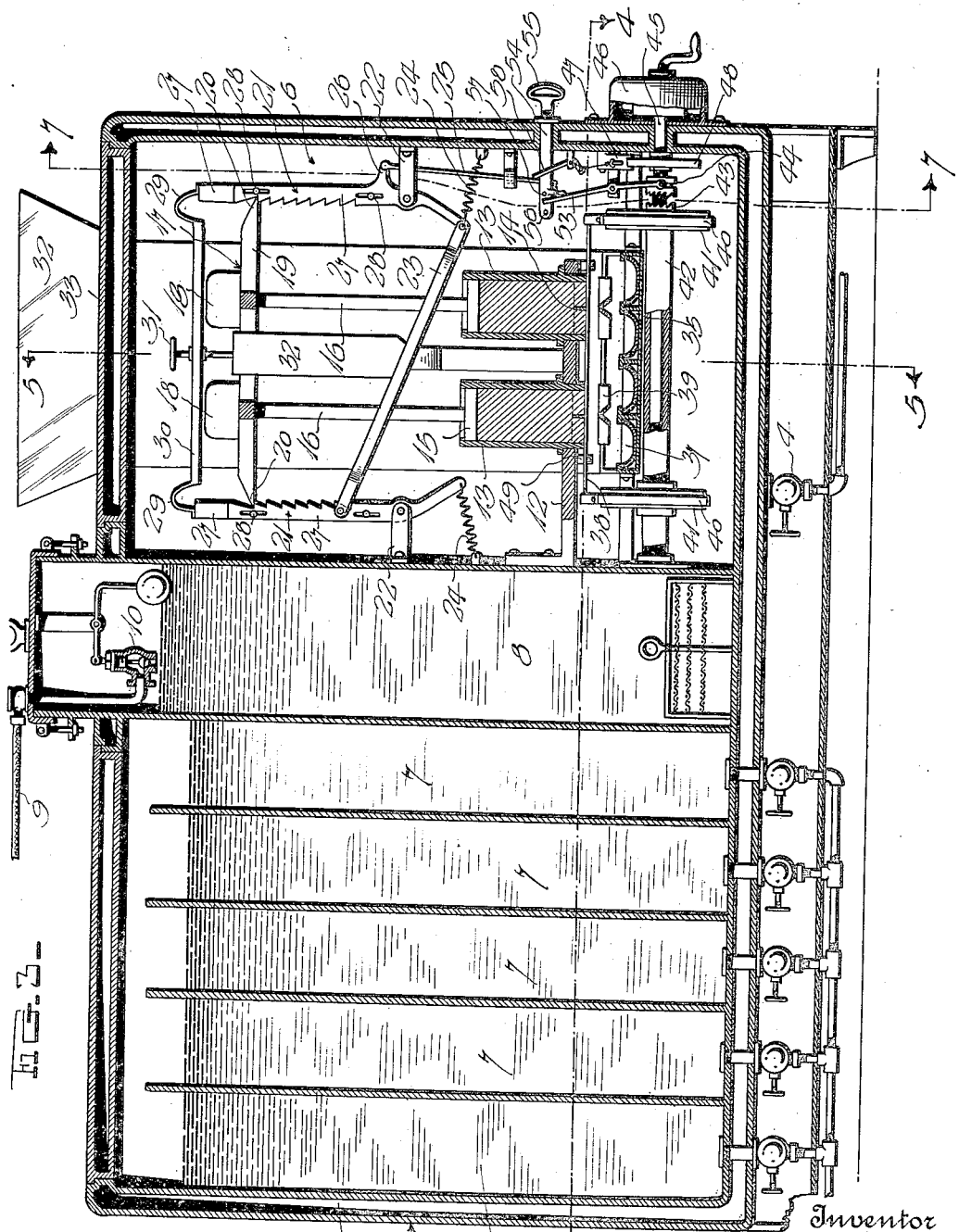

T. TRIPOLITIS.
BUTTER DISPENSING MACHINE.
APPLICATION FILED JUNE 13, 1918.
1,284,493.
Patented Nov. 12, 1918.
5 SHEETS—SHEET 3.
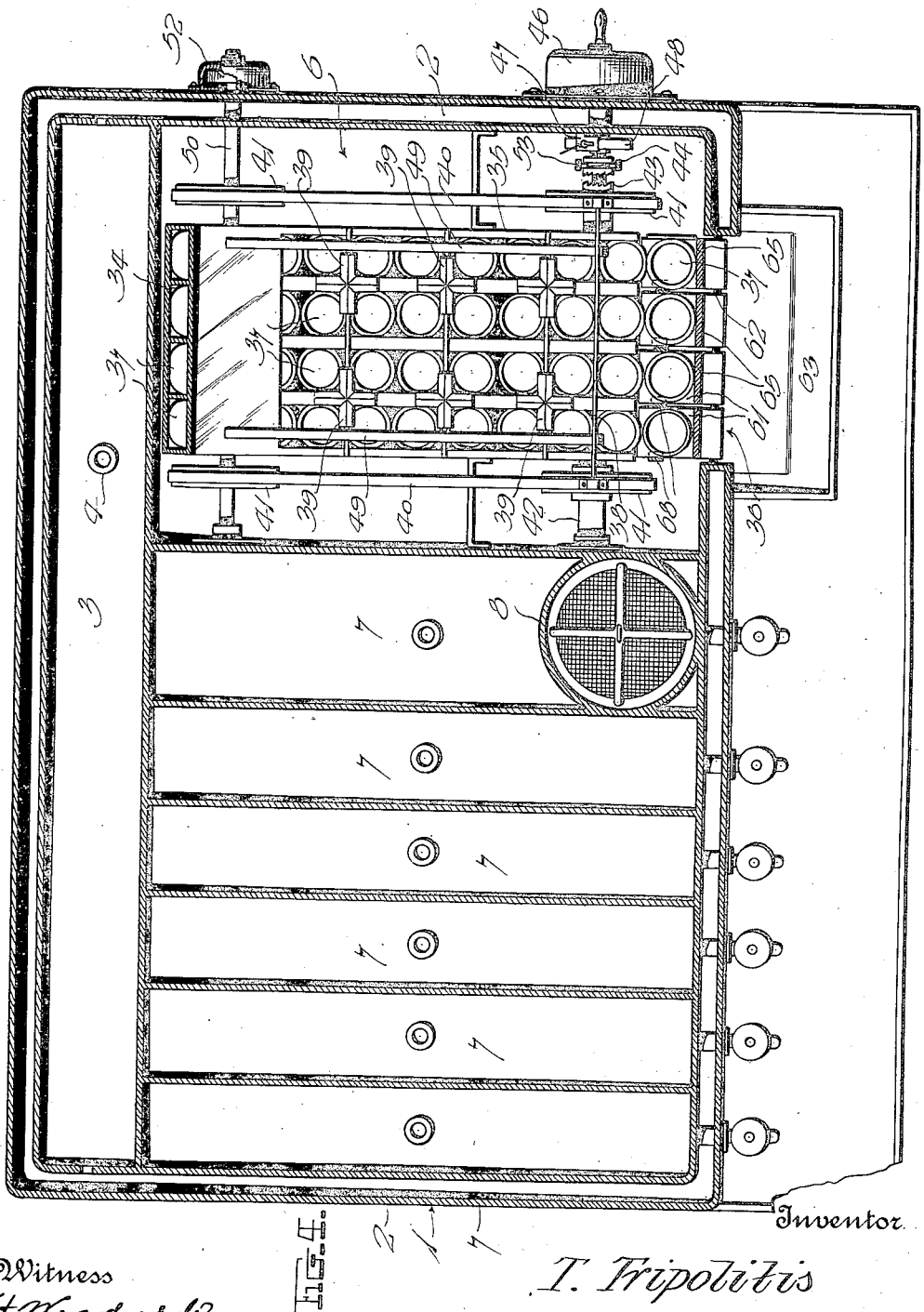
Witness
H. Woodard
Inventor
T. Tripolitis
By H. Q. Wilson &co.
Attorneys

T. TRIPOLITIS.
BUTTER DISPENSING MACHINE.
APPLICATION FILED JUNE 13, 1918.

1,284,493.

Patented Nov. 12, 1918.
5 SHEETS—SHEET 4.

Witness
H. Woodard

Inventor
T. Tripolitis

By H. B. Wilson & Co.
Attorneys

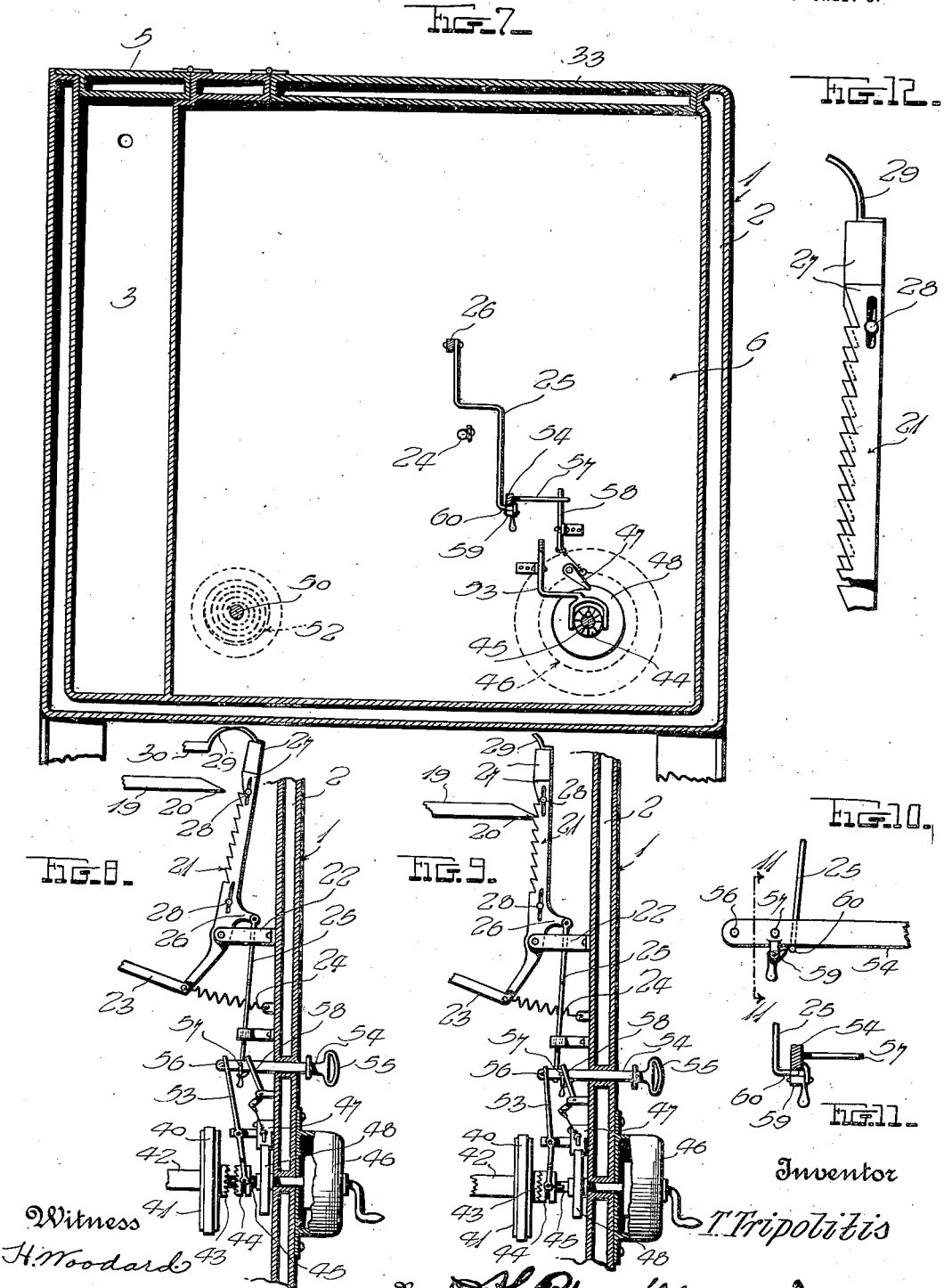

UNITED STATES PATENT OFFICE.

THEMIOS TRIPOLITIS, OF WASHINGTON, DISTRICT OF COLUMBIA.

BUTTER-DISPENSING MACHINE.

1,284,493.  Specification of Letters Patent.  Patented Nov. 12, 1918.

Application filed June 13, 1918.  Serial No. 239,806.

*To all whom it may concern:*

Be it known that I, THEMIOS TRIPOLITIS, a subject of the King of Greece, residing at Washington, in the District of Columbia, have invented certain new and useful Improvements in Butter-Dispensing Machines; and I do declare the following to be a full, clear, and exact description of the invention, such as will enable others skilled in the art to which it appertains to make and use the same.

My invention has for its object to provide a simple and inexpensive, yet highly efficient, machine for dispensing butter on butter chips in restaurants and the like, provision being made whereby the butter is first projected from one end of a receptacle, then cut and deposited on one or more butter chips, and finally discharged from the machine on the chip or chips at the will of the operator.

With the foregoing general object in view, the invention resides in the novel features of construction and unique combinations of parts to be hereinafter fully described and claimed, reference being made to the accompanying drawings which form a part of this application and in which:

Figure 1 is a front elevation of the machine;

Fig. 2 is a top plan view thereof;

Fig. 3 is a vertical section on the plane indicated by the line 3—3 of Fig. 2;

Fig. 4 is a horizontal section on the plane of the line 4—4 of Fig. 3;

Fig. 7 is a vertical section on the plane designated by the line 7—7 of Fig. 3;

Figs. 8 and 9 are detail sectional views similar to the right-hand portion of Fig. 3 and illustrating the operation of the control rod and the parts actuated thereby.

Fig. 10 is an enlarged side elevation showing a portion of the control rod and the means thereon for releasing the locking means of the plunger which discharges the butter;

Fig. 11 is a vertical section of Fig. 10 on the plane of the line 11—11 thereof;

Fig. 12 is an enlarged side elevation of one of the rack bars used to hold the butter plunger normally against movement.

Figure 5:
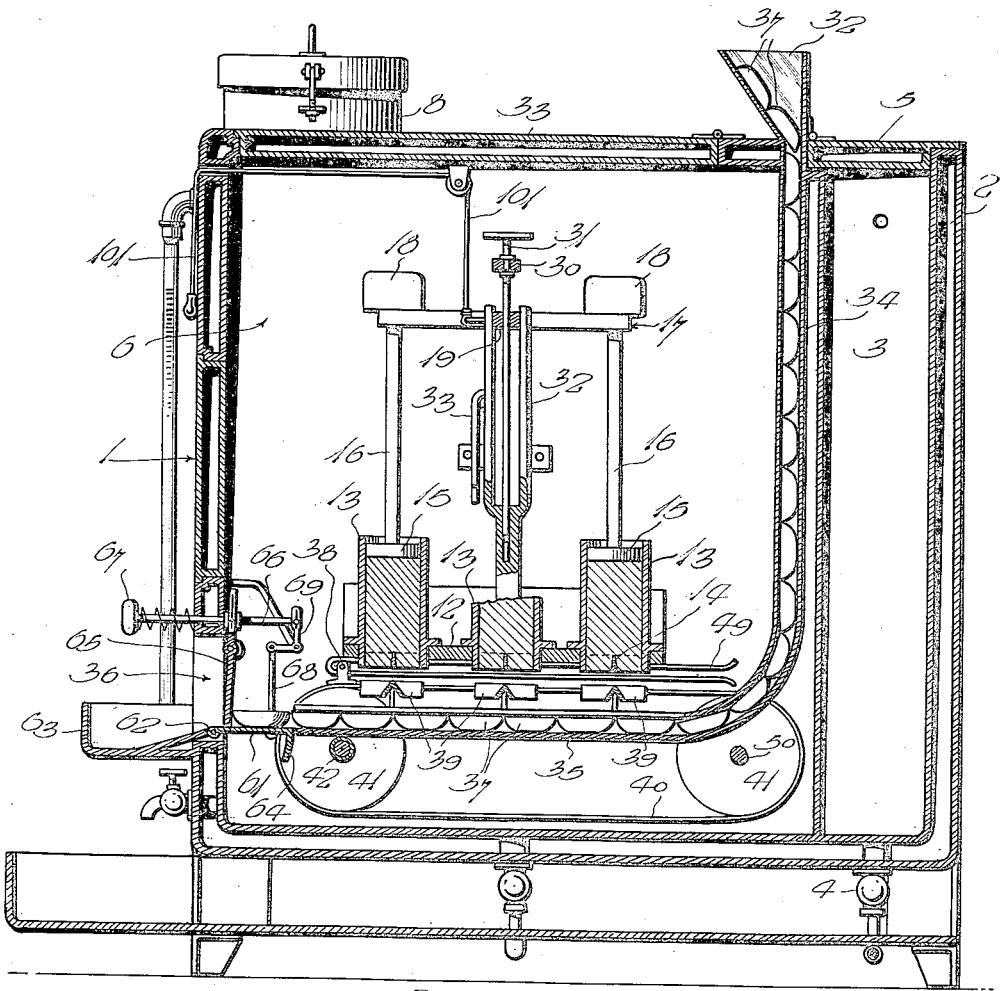
Fig. 5 is a vertical, transverse section as indicated by the line 5—5 of Fig. 3.

In describing my invention, reference will be made to the type illustrated in Figs. 1 to 12.

To this end, numeral 1 designates a suitable casing whose walls 2 are insulated by any preferred means such as those well known in the art of refrigeration. Extending along the rear side of the casing 1 is an ice-box 3 having a drain 4 and a door 5, while the remainder of the casing is divided into a butter dispensing compartment 6 and other compartments 7, adapted to contain different liquids. One of the compartments 7 is provided at its front end with a water cooler 8, into which the water may well be discharged under pressure by a pipe 9 and valve 10 which automatically closes when the cooler is full. The several parts are provided with suitable outlet spigots for their contents and by preference, the cooler 8 is equipped with a filter.

Located in the compartment 6 and supported by a suitable shelf or the like 12, are a number of vertically disposed butter receptacles 13 open at their upper and lower ends, said lower ends having crossed knives 14 for slicing the butter into segments as it is forced from the receptacles by the action of the plungers 15 therein. Rods 16 rise from the plungers 15 and carry a frame 17 upon which weights 18 are located and act by gravity for the purpose of lowering the plungers, said frame including a cross arm 19 having pointed ends 20 coacting with a pair of rack bars 21 to normally prevent downward movement of the frame and consequent depression of the plungers 15. The rack bars 21 are pivoted near their lower ends to suitable supports 22 extending from the sides of the compartment 6, and by means of a link 23, said bars are connected to move either outwardly or inwardly in unison. Coil springs 24 normally retain the rack bars 21 in engagement with the cross arm 19, but by means of a rod 25 depending from a crank arm 26, on one rack bar 21, this bar and consequently the other, may be thrown outwardly as seen in Fig. 8, thus releasing the cross arm 19 and permitting the weights 18 to depress the frame 17 and its plungers 15, thereby forcing a quantity of the butter through the spaces between the knives 14. When the proper amount of butter or the like has been projected, the rod 25 is released and the rack bars 21 return to normal position to prevent further depression of the plungers 15, and immediately after this movement, a cutting means yet to be described comes into play to sever the projected portion of the butter from that in the containers 13.

It will often be necessary to vary the portion of butter, according to the cost and in order that this may be effectively done, I provide means whereby the toothed edges of the rack bars 21 may be changed to permit the cross arm 19 to descend more or less, as occasion may require. In attaining this result, each rack bar is constructed of two longitudinal sections 27, slidably connected at 28, the lower sections being pivoted and carried by the supports 22, while the other sections are attached by springs 29 to a second cross arm 30 above the arm 19. Arm 30 is swiveled to an adjusting screw 31 threaded into a forked guide 32, which is provided for the frame 17, the arms of the fork straddling said arm 19, while the fork shank is secured to the support 12. By adjusting the screw 31, the teeth of the rack bars may be located as shown in Fig. 12 or as disclosed in Figs. 2, 8 and 9. When the former adjustment is used, it will be obvious that much less butter will be dispensed.

Particular emphasis is laid upon the provision of the adjustable rack bars 21, the adjusting means 30—31 common to both bars, and the springs 29 connecting said adjusting means and rack bars. This arrangement obtains the required results and at the same time the springs 29 will yield so as not to materially interfere with the outward swinging of the rack bars when this movement is necessary to release the cross arm 19.

A magazine or hopper 32 is provided at the upper end of the compartment 6 in rear of its door 33, and a plurality of chutes 34 extend downwardly from said hopper and then horizontally at 35 toward an outlet 36. The butter chips 37 are placed in the hopper and fed by gravity along the chutes to receive the butter from the containers 13. In the present showing, six receptacles 13 are disclosed with their lower ends so located as to overlie four of the chips 37, it being, of course, understood that the knives 14 divide the butter into four segments as it is discharged. A wire 38 is provided to cut these segments from the butter within the containers 13, and suitable crossed guides 39 are employed to direct individual portions of butter into the chips, it being seen that twenty-four chips will be filled at one operation of the machine.

The cutting wire 38 is mounted at its ends on endless belts 40 trained around guide wheels 41, two of said wheels being mounted on a tubular shaft 42 having a clutch member 43 on one end coacting with an additional clutch member 44 on one end of a shaft 45 driven by a suitable spring motor 46. A dog 47 and a disk 48 are provided to normally prevent rotation of shaft 45 but when this dog is released and the clutch members 44 and 43 engage, the motor will drive the shaft 42 and will consequently operate the belts 40 to sweep the cutting wire 38 across the lower ends of the receptacles 13. If desired, suitable guides 49 may be provided for the wire 38. The shaft 50 on which the other wheels 41 are mounted, is provided with a spring 52 wound by the rotation of said shaft when the belts 40 are operated, and the moment the clutch members 44 and 43 are disengaged, the tension of spring 52 is exerted to return said belts and the wire 38 to normal position.

For controlling the clutch member 44, a lever 53 (Figs. 3, 8 and 9) is provided, the upper end of said lever being located adjacent the sliding control rod 54, which projects through the side of the compartment 6, the outer end of said rod having a suitable handle 55 while the inner end thereof is equipped with a pin 56 adapted to strike and operate the lever 53 when the rod is pulled outwardly, thereby throwing the clutch into operative position. At approximately the same time, a second pin 57 on the rod 54 strikes and operates a bell crank 58 to release the dog 47, thus permitting the motor 46 to operate the cutting means. Prior to such actuation and release of the dog, however, the rod 25 is pulled downwardly to permit the necessary descent of the frame 17 and plunger 15. This downward pull on rod 25 is effected by means of a pivoted cam 59 (see more particularly Figs 10 and 11) on the rod 54, and a lateral finger 60 on said rod 25. When the rod 54 is pulled outwardly, the cam 59 strikes and lowers the lateral finger 60 thus pulling downwardly upon rod 25 to release the rack bars 21. After this has taken place, sufficient time having elapsed to permit projection of the butter from the containers 13, the pins 56 and 57 come into play to actuate their respective parts, thus causing the wire 38 to sweep over the lower ends of the butter compartments, severing the pieces of butter and causing them to drop into the chips.

Figure 6:
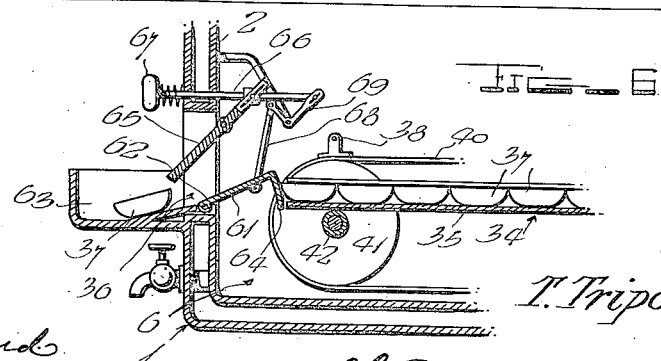
Fig. 6 is a detail section similar to a portion of Fig. 5, showing the manner in which the chips are discharged.

At the lower edge of the outlet opening 36 and in horizontal alinement with the portions 35 of the chutes 34, are platforms 61 each adapted to receive a previously filled butter chip. The front edges of the platforms 61 are pivotally mounted at 62 for tilting, as seen in Fig. 6, whereby to slide the filled chip into a suitable tray or the like 63. The inner edge of each platform 61 is provided with a depending flange 64 which serves as a stop to hold the other chips against forward sliding when one chip is being discharged. A plurality of bars 65 normally close the outlet 36, one door being provided for each platform 61. By means of sliding rods 66 having push buttons 67, any door may be opened as depicted in Fig. 6 to discharge one filled butter chip, and in order to simultaneously tilt the adjacent platform 61 when any door 65 is opened, said platforms are provided with upwardly extending links 68 connected to bell cranks 69 operated by inward movement of the rods 66. After a rearward push on any button 67 and the consequent discharge of a filled butter chip, release of the button will permit the parts to return to normal position, whereupon another filled chip will slide onto the platform.

From the foregoing taken in connection with the accompanying drawings, it will be obvious that I have provided a butter dispensing machine which will be rather simple in operation, yet highly efficient and durable, and in every way desirable.

Since probably the best results are obtained from the structural features shown and described, they are by preference followed, but it is to be understood that within the scope of the invention as claimed, considerable latitude is allowed for making such changes as occasion may dictate.

I claim—

1. In a butter dispensing machine, an open-ended butter receptacle, a plunger for forcing the butter from one end of said receptacle, self-acting means for operating said plunger means for holding said self-acting plunger-operating means normally idle, a cutter operating across said end of the receptacle, operating means for said cutter, and control means for successively releasing said holding means and throwing said cutter operating means into play.

2. A structure as specified in claim 1, together with means tensioned by the movement of said cutter for returning the same to normal position.

3. In a butter dispensing machine, an open-ended butter receptacle, and means for forcing butter from one end thereof, a cutter movable across said end of the receptacle, a pair of endless belts to which the ends of said cutter are attached, rotary members around which said belts pass and means for driving certain of said members.

4. In a butter dispensing machine, an open-ended butter receptacle, and means for forcing butter from one end thereof, a cutter movable across said end of the receptacle, a pair of endless belts to which the ends of said cutter are attached, rotary members around which said belts pass, normally idle means for driving certain of said members and means for successively throwing said butter forcing means and said driving means into play.

5. A structure as specified in claim 3, together with a spring connected to another of said rotary members and wound when said member is rotated by said belts, whereby to return said belts and cutter to normal position when said driving means is released.

6. In a butter dispensing machine, an open-ended butter receptacle, means for forcing the butter from one end of said receptacle, fixed cutting means across said end of the receptacle to cut the butter as it is projected, a cutter movable across said end of the receptacle to sever the projected and cut portions of the butter, and crossed guides for directing the several pieces of butter to different points at which butter chips are adapted to be placed.

7. In a butter dispensing machine, an open-ended butter receptacle, a plunger for forcing the butter from one end of the receptacle, means for operating said plunger, and means for cutting the butter projected from the receptacle; together with a lateral arm movable bodily with said plunger, a rack bar for holding said arm after each operation of said plunger, and means for moving said rack bar from engagement with said arm prior to actuation of said cutting means.

8. In a butter dispensing machine, an open-ended butter receptacle, a plunger for forcing the butter from one end of the receptacle, means for operating said plunger, and means for cutting the butter as it is projected from the receptacle; together with a cross arm movable bodily with said plunger, a pair of pivoted rack bars normally engaging the ends of said cross arm to hold the plunger against movement, and means for rocking said rack bars from engagement with said cross arm prior to actuation of said cutting means.

9. A structure as specified in claim 7, said rack bar consisting of two longitudinal toothed sections disposed side by side and means for adjusting said sections relatively to vary the amount of operation of said plunger.

10. In a butter dispensing machine, an open-ended butter receptacle, a plunger for forcing the butter from one end of the receptacle, means for operating said plunger, and means for cutting the butter projected from the receptacle; together with a lateral arm movable bodily with said plunger, a rack bar coacting with the end of said arm to arrest movement of said plunger and hold the same after each actuation thereof, said rack bar consisting of two longitudinal toothed sections slidably connected side by side, means supporting one of said sections to permit movement of said rack bar from said arm, a second arm, a yielding connection between said second arm and the other section of said rack bar, means for adjusting said second arm to correspondingly adjust said rack bar and means for moving said rack bar out of engagement with arm prior to actuation of said cutter.

11. In a butter dispensing machine, an open-ended butter receptacle, a plunger for forcing the butter from one end of said receptacle, operating means for said plunger, a cutter movable across said end of the receptacle, means including a spring motor and a clutch for operating said cutter, a slidable control rod for said clutch, means operated from said rod for releasing the spring motor when said clutch is thrown to operative position, means for normally holding said plunger against movement, and means operated from said control rod for releasing said holding means prior to the application of the clutch.

12. In a butter dispensing machine, an open-ended butter receptacle, a plunger for forcing the butter from one end of said receptacle, operating means for said plunger, a cutter movable across said end of the receptacle, means including a spring motor and a clutch for operating said cutter, a slidable control rod for said clutch, means operated from said rod for releasing the spring motor when said clutch is thrown to operative position, means for normally holding said plunger against movement, a pivoted cam on said rod, and a pull rod having a lateral finger engaged by said cam, said pull rod being connected to said connecting means for releasing the same prior to actuation of said clutch.

13. In a butter dispensing machine, the combination of a casing having an outlet, means for guiding butter chips toward said outlet, means for filling a plurality of the chips with butter, and means at said outlet for ejecting a filled chip and retaining the remainder of the filled chips in the casing for future use.

14. In a butter dispensing machine, the combination of a casing having a plurality of individual outlet doors, means for guiding butter chips toward said doors, means for filling the chips with butter, and means for ejecting a filled chip when any door is opened.

15. A structure as specified in claim 14, together with means for retaining the other filled chips in the casing for future use.

16. In a butter dispensing machine, the combination of a casing provided with an outlet, means in said casing for guiding butter chips toward said opening, a tilting platform adjacent said opening to receive a predetermined number of chips, the inner edge of said platform forming a stop for the other chips when said platform is tilted to raise said edge, a door for said outlet, and connecting means between said door and said platform to rock the latter as specified, when said door is opened, together with means in the casing for placing butter on said chips.

In testimony whereof I have hereunto set my hand.

THEMIOS TRIPOLITIS.